United States Patent [19]
Schuster et al.

[11] Patent Number: 5,778,192
[45] Date of Patent: Jul. 7, 1998

[54] METHOD AND DEVICE FOR OPTIMAL BIT ALLOCATION BETWEEN DIFFERENT SOURCES OF INFORMATION IN DIGITAL VIDEO COMPRESSION

[75] Inventors: Guido M. Schuster, Evanston; Aggelos Katsaggelos, Chicago; Mark R. Banham, Arlington Heights; James C. Brailean, Park Ridge, all of Ill.

[73] Assignees: Motorola, Inc., Schaumburg; Northwestern University, Evanston, both of Ill.

[21] Appl. No.: 548,785

[22] Filed: Oct. 26, 1995

[51] Int. Cl.⁶ .................................................. H04N 11/02
[52] U.S. Cl. ................. 395/200.77; 348/384; 348/390; 348/405; 382/232
[58] Field of Search ...................... 395/200.18, 200.77; 364/514 A, 514 R, 715.02; 382/232, 236, 239; 348/387, 394, 399, 400, 401, 405, 415, 701, 390, 375, 396, 404, 409, 391, 412, 413, 417, 418, 429, 422, 419, 420; 358/426, 430; 341/200

[56] References Cited

U.S. PATENT DOCUMENTS

| | | | |
|---|---|---|---|
| 5,297,170 | 3/1994 | Eyuboglu et al. | 375/25 |
| 5,506,686 | 4/1996 | Auyeung et al. | 358/261.2 |
| 5,521,988 | 5/1996 | Li et al. | 382/248 |
| 5,612,900 | 3/1997 | Azadegan et al. | 364/514 R |
| 5,686,963 | 11/1997 | Uz et al. | 348/404 |
| 5,691,770 | 11/1997 | Keesman et al. | 348/405 |

OTHER PUBLICATIONS

"Bit Allocation for Dependent Quantization with Applications to Multiresolution and MPEG Video Coders", K. Ramchandran et al., IEEE Transactions on Image Processing, vol. 3, No. 5, pp. 533–545, Sep. 1994.

"Optimal Trellis–Based Buffered Compression and Fast Approximations", A. Ortega et al., IEEE Transactions on Image Processing, vol. 3, No. 1, pp. 26–40, Jan. 1994.

"An Optimal Bit Allocation Algorithm for Sub–Band Coding", P.H. Westerlink et al., ICASSP '88: Acoustics, Speech & Signal Processing Conference, pp. 757–760, 1988.

"Efficient Quadtree Coding of Images and Video", G. Sullivan et al., IEEE Transactions on Image Processing, vol. 3, No. 3, pp. 327–331, May 1994.

"Optimal Buffer–Constrained Source Quantization and Fast Approximations", A. Ortega et al., Circuits and Systems, 1992 IEEE International Symposium, pp. 192–195.

"Image Compression via Improved Quadtree Decomposition Algorithms", E. Shustermann et al., IEEE Transactions on Image Processing, vol. 3, No. 2, pp. 207–215, Mar. 1994.

"Optimal Data Partitioning of MPEG–2 Coded Video", A. Elefheriadis et al., Image Processing, 1994 International Conferrence, pp. 273–277, 1994.

(List continued on next page.)

*Primary Examiner*—James P. Trammell
*Assistant Examiner*—Tony M. Cole
*Attorney, Agent, or Firm*—Darleen J. Stockley

[57] ABSTRACT

The present invention provides a method (200, 400) and device (500) for, within a variable or fixed block size video compression scheme, providing optimal bit allocation among at least three critical types of data: segmentation, motion vectors and prediction error, or DFD. Since the amount of information represented by one bit for a particular type of data is not equivalent to the information represented by one bit for some other data type, this consideration is taken into account to efficiently encode the video sequence. Thus, a computationally efficient method is provided for optimally encoding a given frame of a video sequence wherein, for a given bit budget the proposed encoding scheme leads to the smallest possible distortion and vice versa, for a given distortion, the proposed encoding scheme leads to the smallest possible rate.

40 Claims, 4 Drawing Sheets

OTHER PUBLICATIONS

"Bit Allocation for Dependent Quantization with Applications to MPEG Video Coders", K. Ramchandran et al., ICASSP '93, Acoustics Speech & Signal Processing, pp. V-381-V-384.

Kannan Ramchandran, Antonio Ortega, Martin Vetterli, "Bit Allocation for Dependent Quantization with Applications to Multiresolution and MPEG Video Coders", IEEE Transactions on Image Processing, vol. 3, No. 5, Sep. 1994, pp. 533-545.

Mark R. Banham, James C. Brailean, Cheuk L. Chan and Aggelos K. Kastagglos, "Low Bit Rate Vido Coding Using Robust Motion Bector Regeneration in the Deocer" IEEE Transactions on Image Processing, vol. 3, No. 5, Sep. 1994.

K. Metin Uz, Jerome M. Shapiro, and Martin Czigler, "Optimal Bit Allocation in the Presence of Quantizer Feedback", The David Sarnoff Research Center, IEEE, 993 V-85-V388.

Kannan Ramchandran, Antonio Ortega, Martin Vetterli, "Bit Allocation for Dependent Quantization with a Applications to MPEG Video Coders", IEEE 1993 Department of Electrical Engineering and Center for Telecommunications Reseqarch, V-381-V384.

Antonia Ortega, Kannan Ranchandra, Martin Vetterli, "Optimal Trellis-Based Buffered Compression and Fast Approximations", IEEE, 1994 Log No. 9213624 pp. 26-39.

Kannon Ramchandran, Antonio Ortega, and Martin Vetterli, "Bit Allocation for Dependent Quantization with Applications to Multiresolution and MPEG Video Coders", IEEE Transactions on Image Processing vol. 3, No. 5, Sep. 1994 pp. 533-545.

5,778,192

METHOD AND DEVICE FOR OPTIMAL BIT ALLOCATION BETWEEN DIFFERENT SOURCES OF INFORMATION IN DIGITAL VIDEO COMPRESSION

FIELD OF THE INVENTION

The present invention is related to encoding motion information, displaced frame information and segmentation information in digital video compression, and more particularly, to Lagrangian relaxation which includes dynamic programming for optimally encoding the above information.

BACKGROUND OF THE INVENTION

Block-based motion compensated transform coders (BBMCTC) are the most common and important video coders today. Video standards, such as H.261, MPEG-1 and MPEG-2 are based on this concept, and, therefore, it is expected that they will continue to be the dominant technology within the expanding multimedia market. A BBMTC codec reduces the amount of spatial and temporal information encoded for a video sequence using a two step approach. First, motion estimation and compensation are used to reduce the amount of temporal redundancy that exists in a video sequence. This is accomplished by dividing both the present and past image frames into blocks, generally of the fixed size 16 horizontal pixels by 16 vertical pixels in the luminance channel, and finding the best match for each block in the present frame with a block in the past frame. A motion vector that describes this match is assigned to each block in the present frame. These motion vectors are then used to compensate the previous image frame producing a temporal prediction of the present frame. The temporal redundancy that exists in the video sequence is reduced by taking the difference between the present frame and the temporal prediction.

The second step of a BBMCTC type codec involves encoding this difference image, called the Displaced Frame Difference (DFD), using a block-wise Discrete Cosine Transform (DCT). Transforming the DFD using the DCT and eliminating the higher frequency coefficients reduces the spatial information remaining within a block. Both the motion vectors and the remaining DCT coefficients are entropy encoded and transmitted to the decoder where they are used to reconstruct the encoded video sequence.

Variable block size block matching, BM, approaches are also beginning to be utilized. For instance, the ITU-T draft standard H.263 has the ability to encode a 16×16 block, or four 8×8 blocks with independent motion vectors. Typically, the decision to reduce the block size is made strictly based on the energy contained within the blocks of the DFD. If the sum of the energy contained in the four 8×8 blocks (each having its own motion vector) is less than the energy contained in the single 16×16 block, then the split is permitted. Similar to fixed block case discussed above, the underlying assumption is that the lower the DFD energy for a particular block, the easier it will be to encode, i.e., the fewer bits it will require. This assumption is somewhat faulty since it does not take into account the fact that more motion information plus additional segmentation information must also be encoded and transmitted in this case.

BBMCTC methods generally limit the bit allocation problem to the DCT coefficients. In these cases, the rate incurred to transmit motion and other information is not considered when trying to optimize for the overall rate and distortion. Typically, as the output buffer becomes full these methods increase the step size of the quantizer that is applied to the DCT coefficients. This results in a decrease in the output rate of these video codecs, however, such a rate decrease comes at an unknown cost in additional distortion over the optimal distortion.

Optimal bit allocation for a finite set of admissible quantizers has been treated previously in the literature. Generally, the methods discussed treat encoding of each macroblock as a separate problem. However, since better compression efficiency is achieved by using differential PCM for the displacement vector field, DVF, optimal decisions for the encoding of a given block cannot be made independently of the decisions for other blocks. None of the previously reported work offers a solution to the critical problem of optimally allocating the available bits over all of the different types of data which need to be encoded: segmentation, motion vectors, and DFD, in a dependent way.

DETAILED DESCRIPTION OF A PREFERRED EMBODIMENT

Figure 1:
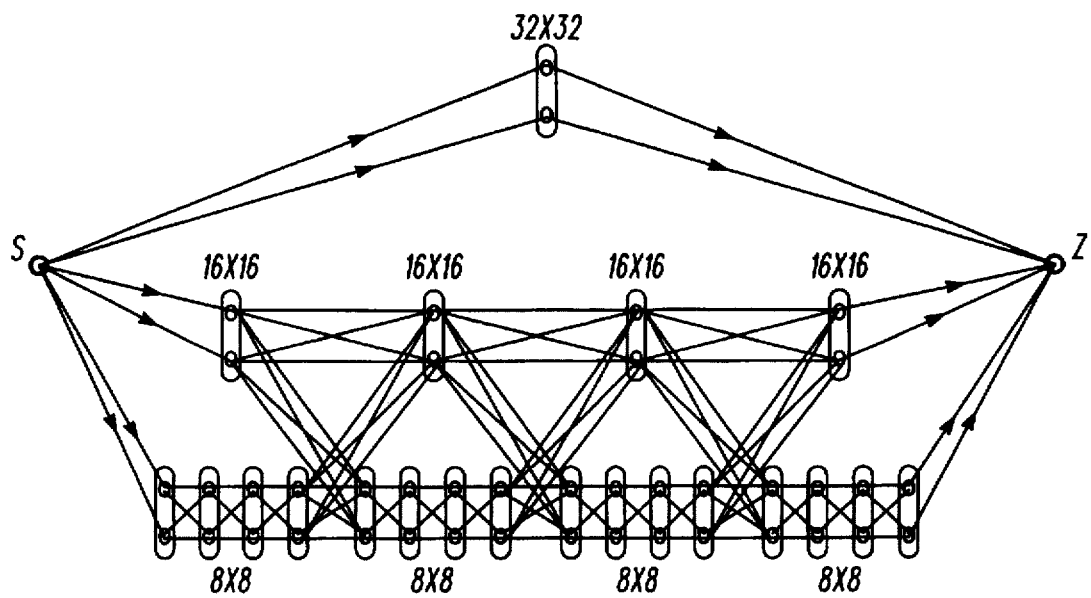
FIG. 1 is a diagrammatic representation of a multi-level trellis in accordance with the present invention.

The present invention provides a method and device which provide optimal bit allocation among a plurality of information types used in motion compensated video coding. Specifically, this invention solves the problem of optimal bit allocation among three critical types of data: segmentation, motion vectors and prediction error, or DFD. However, additional data types can easily be incorporated into the problem, e.g., the cost of error protection for the different data types being encoded. This invention can be utilized within a variable or fixed block size video compression scheme. As described above, the problem of dividing the available bits among the three critical types of data considered here is difficult, but crucial in the design of an efficient video codec. The difficulty lies in the fact that the amount of information represented by one bit for a particular type of data is not equivalent to the information represented by one bit for some other data type. For instance, the information contained in a bit representing motion vector data is considerably greater than that of a bit used to represent intensity at a given pixel. This type of consideration must be taken into account if a video sequence is to be efficiently encoded. This invention provides a computationally efficient method to optimally encode a given frame of a video sequence in the rate distortion sense, i.e., for a given bit budget the proposed encoding scheme will lead to the smallest possible distortion or vice versa, for a given distortion, the proposed encoding scheme will lead to the smallest possible rate.

The underlying assumptions utilized by this invention are that the variable block size or segmentation information is encoded by a quadtree code and the DVF is handled by differential coding between two consecutive motion vectors along the scanning path. The DVF is defined as the twodimensional vector field made up of the motion vectors associated to a particular frame. The motion estimation is performed at the lowest level provided by the quadtree segmentation, i.e. the smallest block size. This results in a DVF with the highest accuracy and the highest cost in bits to encode. The optimal bit allocation provided by this invention will determine when this accuracy is required and when it is not. In other words, bits are taken away from the DVF, i.e., smaller blocks are merged into larger blocks, and used to encode the other data types. The displaced frame difference can be coded with any block-based coding scheme. In addition to the above assumptions, the distortion measure for the frame has to be additive with respect to the blocks.

Mathematically, the problem of optimally allocating bits is formulated as follows:

$$\min\{D_{frame}\} \text{ subject to } (R_{frame} \leq R_c) \qquad (1)$$

where $D_{frame}$ is the distortion introduced into a video frame encoded at a bit rate of $R_{frame}$, which is less than or equal to the critical bit rate of the channel $R_c$. This constrained problem can be solved using the Lagrange multiplier approach. This approach transforms the constrained problem into a series of unconstrained problems with a Lagrange multiplier parameter $\lambda$, that is, $$\min\{J(\lambda,B)\} \qquad (2)$$

where the Lagrangian cost $J(\lambda,B)$ is equal to $$J(\lambda,B) = R_{frame}(B) + \lambda \cdot D_{frame}(B). \qquad (3)$$

The parameter B represents the decision vector which contains the information about the segmentation, DVF and DFD, and $\hat{B}(\lambda)$ represents the optimal vector. Only an optimal solution guarantees a non-increasing $D_{frame}(\hat{B}(\lambda))$ and a non-decreasing $R_{frame}(\hat{B}(\lambda))$ as a function of $\lambda$, hence the optimal $\lambda$ which satisfies the constrained problem can be found by bisection or some other method. Therefore, the main task is solving the unconstrained problem of Eq. (3) optimally such that all the resulting rate distortion points are on a convex hull which is traced out by sweeping over $\lambda$, where $0 \leq \lambda \leq \infty$. In other words, for every $\lambda$, there exists an optimal $\hat{B}$ that results in a particular distortion, $D_{frame}(\hat{B}(\lambda))$ and rate $R_{frame}(\hat{B}(\lambda))$. If plotted, the resulting rate-distortion points would lie on a convex hull. Knowledge of this relationship is utilized in efficiently finding the correct $\lambda$ which results in an optimal solution which satisfies both Eq. (1) and (3).

The unconstrained problem of Eq. (3) could be solved by an exhaustive search with a very high computational cost. However, since the DVF is encoded using first order differential pulse code modulation, DPCM, and the quantization parameters for the DCT blocks are also differentially encoded, dynamic programming can be utilized at a fraction of the computational costs.

Dynamic programming, DP, is a very general tool that has been studied extensively in the field of optimization. The main advantage of DP over other optimization techniques is its ability to efficiently handle complicated constraint sets. Furthermore, DP leads to a globally optimal solution, as opposed to other techniques which can not guarantee this. This globally optimal solution is determined through the use of a DP recursion formula. In particular, this invention utilizes a DP recursion formula called the Viterbi algorithm. An advantage of the Viterbi algorithm is that it can be implemented through the use of a trellis. The recursion formula and its implementation are discussed below.

As mentioned above, the frame segmentation is represented as a quadtree structure, the cost of the quadtree encoding has to be included in the dynamic programming approach. The rate-distortion characteristics of the different block sizes also have to be included in the optimization process. The optimal path through the trellis found by the Viterbi algorithm identifies, in a rate-distortion sense, the optimal quadtree decomposition as well as the optimal bit allocation between the DVF and DFD data types. Note that the dependency in the quadtree decomposition comes from the fact that the leaves of the quadtree reflect the block sizes for which the motion vectors are encoded, and that the difference between two consecutive motion vectors, which do not necessarily belong to blocks of the same size, along the scanning path is encoded by a variable length code. It should be noted that any scan of blocks in the frame that provide a first order prediction for the differential quantities being encoded can be used. For example, a Hilbert or raster scan provides this first order prediction. Since the code words for small differences between motion vectors are shorter than for large differences, the optimal solution in a rate distortion sense will lead to an inhomogeneous, but smooth motion field. To be able to employ the Viterbi algorithm, a dynamic programming, DP, recursion formula needs to be established. A graphical equivalent of the DP recursion formula is a trellis where the admissible nodes and the state transitions are explicitly indicated.

As discussed above the following assumption needs to be made such that the DP can be solved efficiently. The frame distortion is the sum of the individual block distortions, that is, $$D_{frame} = \sum_{k=1}^{N_B} D_k \qquad (4)$$

where $N_B$ is the total number of blocks within a frame. Most common distortion measures, such as the mean squared error (MSE), a weighted MSE or the peak signal to noise ratio (PSNR) fall into this class.

Consider FIG. 1, numeral 100, which represents the multi-level trellis for a 32×32 image block ($N_B$=5), with a quadtree segmentation developed down to level 3 ($n_0$=3, block size 8×8). The quadtree structure is indicated by the white boxes with the rounded corners. These white boxes do not belong to the trellis used for the Viterbi decoder but indicate the set of admissible state values for the individual blocks at different levels. The black dots inside the white boxes are the nodes of the trellis (i.e., the state values). Note that for simplicity, only two trellis nodes per quadtree node are indicated, but in general, a block at a given quadtree level can contain any number of trellis nodes. The auxiliary nodes, start, S, and termination, Z, are used to initialize the DPCM of the motion vectors, S, and to select the path with the smallest cost, Z.

Each of the trellis nodes represent a different way of encoding the block it is associated with. Since the state of a block is defined to contain its motion vector and its quantizer step size, each of the nodes contains the rate and distortion occurring by predicting the associated block with the given motion vector and encoding the resulting DFD with the given quantizer step size.

The key to making this technique computationally efficient is to reduce the number of admissible nodes in each of these boxes. As mentioned, because the quantization parameters are differentially encoded, the number of possible quantization values that can be taken from one node to the next is reduced to the number permissible by the encoding scheme. For example, in H.263, the syntax only allows the quantization parameter to change by $+/-1$, $+/-2$, or 0 between blocks. In addition, the number of possible motion vectors which can be chosen for each block can be constrained to a subset of the maximum number of possible vectors by limiting the search region, or applying a threshold which keeps only those vectors satisfying a preset distortion criteria for that block. For example, the integer motion vectors can be searched first, and then the top vectors which produce a distortion for that block within the preset threshold can be kept. The half pixel positions around those integer positions can then be searched, and the resulting rate distortions of those vectors can form nodes at that block. This significantly reduces the number of nodes on the trellis, without introducing any significant degradation in quality, thus making the solution computationally feasible.

As can be seen in FIG. 1, not every trellis node can be reached from every other trellis node. This is because of the fact that at one level, a block can replace four blocks of the level below it. Assume that no quadtree segmentation would be used, and the block size would be fixed at 8×8. In that case, only the lowest level in FIG. 1 would be used in the trellis. The transition costs between the trellis nodes would be the rate required to encode the motion vector differences between consecutive blocks along the scanning path. Assume, now, that the next higher level of the quadtree is included. Clearly the transition cost between the trellis nodes of the previous level stay the same. In addition, there are now transition costs between the trellis nodes of the new level and also transition cost from trellis nodes of the previous level to trellis nodes of the new level, and vice versa, since each cluster of four blocks at the previous level can be replaced by a single block at the new level.

Having established the multi-level trellis, the Viterbi algorithm can be used to find the optimal state sequence which will minimize the unconstrained problem given in Eq. (3). The algebraic equivalent of the multi-level trellis is the DP recursion formula discussed below.

Each node $x_j$ of the multi-level trellis contains $R^{DFD}(X_j)$, the rate needed to encode the DFD of the corresponding block i at level l using the motion vector $m_{l,i}$ and the quantizer $q_{l,i}$, which together with the level l and block number i define the node. It also contains $D(x_j)$, which is the distortion occurring when the corresponding block is encoded using the given motion vector and quantizer. Each node also contains $R^{SEG}(x_j)$, which is the recursively distributed quadtree encoding cost. In addition to that, the transition cost $R^{DVF}(x_{j-1}, x_j)$ is the number of bits required for the encoding of the motion vector difference and, if applicable, the quantizer step size difference between node $X_{j-1}$ and node $X_j$. The dependency between the blocks is expressed by these terms and it is the reason for using dynamic programming to solve the optimization problem.

The goal of the DP is to find the state sequence B which will minimize the Lagrangian cost of Eq. (3). Let $J(\lambda, |X_0 K X_k|^T)$ be the Lagrangian cost up the kth stage in the trellis, $$J(\lambda, |x_0 K x_k|^T) = \sum_{j=1}^{k} R^{DFD}(x_j) + R^{SEG}(x_j) + R^{DVF}(x_{j-1}, x_j) + \lambda \cdot D(x_k) \quad (7)$$

where $x_{-1}=S$, the auxiliary starting node.
This expression leads to the DP recursion formula, $$J(\lambda, x_{k+1}) = \min\{J(\lambda, x_k) + R^{DFD}(x_{k+1}) + R^{SEG}(x_{k+1}) + R^{DVF}(x_k, x_{k+1}) + \lambda \cdot D(x_{k+1})\} \quad (8)$$

Having established the DP recursion formula, the forward DP algorithm can be used to find the optimal state sequence which will minimize the unconstrained problem given in Eq. (3).

As discussed above, the DP approach described here allows for the global optimization of quantization step sizes throughout a coded image, subject to a target bit expenditure for that frame. For example, based on the target bit rate for a given frame, a function of the buffer fullness and the target frame rate, a set of possible quantization step sizes may be provided, i.e. {8,9,10,11,12}. The trellis containing the costs, in bits, of all coded macroblocks is generated using these step sizes. The constrained optimization problem which is solved here finds the minimum cost path through this trellis which meets a specified distortion constraint. For certain applications where very low bit rates are required, a weighted distortion based on a perceptual criterion may be used to improve the perceptual quality. The perceptual weighting is based on a spatially varying quantization map which weights the center of the frame more favorably then its outer regions. This is done to take advantage of the fact that the object of interest generally resides in the center of the frame. This weighting can also be changed to reflect the importance of a specific region or object within the scene through the use of segmentation. More bits are thus assigned to the perceptually important region of the image.

Figure 2:
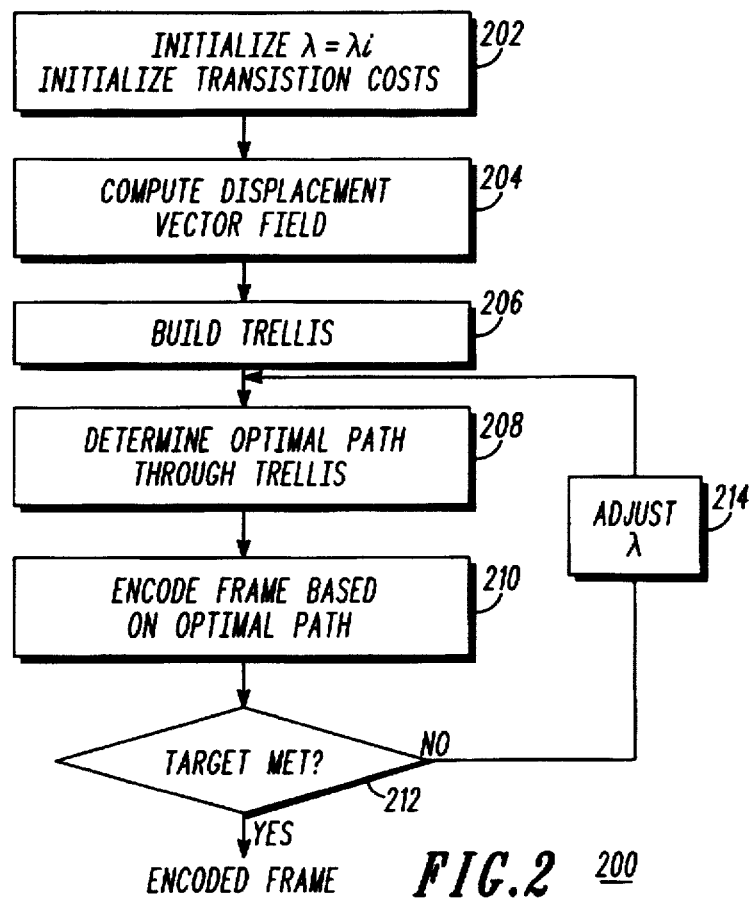
FIG. 2 is a flow diagram of a preferred embodiment of a method for optimally encoding a given frame of a video sequence in the rate distortion sense in accordance with the present invention.

The present invention is more fully described with reference to FIGS. 2–5. FIG. 2, numeral 200 is a flow diagram of a preferred embodiment of a method for optimal encoding of a displacement vector field, displaced frame difference and segmentation in accordance with the present invention. The first step in this method is to initialize the transition costs and the Lagrange multiplier parameter $\lambda$ (202). The predetermined initial value for, $\lambda$, $\lambda_i$ is equal to 1000. As described above, the transition costs $R^{DVF}(X_{j-1}, x_j)$ is the number of bits required for the encoding of the motion vector difference and the quantizer step size difference between node $x_{j-1}$ and node $x_j$. These costs are directly related to the length of the codes used to encode these differentials and can be calculated off-line. The next step is to determine the DFD signal resulting from a predetermined set of allowable motion vectors for each block at the lowest level of the quadtree, i.e., the smallest block size (204). As shown in FIG. 1, the lowest level of the quadtree used in this implementation results in a block size of 8×8. This predetermined set of allowable motion vectors is determined by the range of motion to be encountered as well as the number of code words used to represent this motion. Typically, 64 code words are used to represent a motion vectors differential, resulting in a range of +/−15 pixels in both the x and y direction with half pixel accuracy. A method similar to block matching motion estimation is utilized in determining the possible DFD signals for each of 8×8 blocks. In this method, the present frame is divided into 8×8 non-overlapping blocks. All pixels contained in a block are assumed to have the same motion. For each motion vector in the predetermined set, a DFD signal is generated for each 8×8 block and stored in memory. The DVF that is finally encoded is a subset of this predetermined set and is chosen because its effect on producing an optimal solution to bit allocation problem.

Once the DVF is determined using the lowest level of the quadtree, the next step is to completely determine each node of the multi-level trellis (206). As described above, each node $X_j$ of the multi-level trellis contains $R^{DFD}(x_j)$, the rate needed to encode the DFD of the corresponding block i at level l using the motion vector $m_{l,i}$ and the quantizer $q_{l,i}$, which together with the level I and block number i define the node. It also contains $D(x_j)$, which is the distortion occurring when the corresponding block is encoded using the given motion vector and quantizer. Each node also contains $R^{SEG}(x_j)$, which is the recursively distributed quadtree encoding cost. In addition to that, the transition cost $R^{DVF}(x_{j-1},x_j)$ is the number of bits required for the encoding of the motion vector difference and, if applicable, the quantizer step size difference between node $x_{j-1}$ and node $x_j$.

For node $x_j$ of the multi-level trellis, the motion vector $m_{l,i}$ and the quantizer $q_{l,i}$ are crucial in determining the rate $R^{DFD}(x_j)$ needed to encode the DFD. The motion vector, $m_{l,i}$, at level l is determined based on the motion vectors at level l–1 That is, motion vectors for the upper nodes are determine by the motion vectors of the lower nodes. For instance, level 0 contains the motion vectors for the 8×8 blocks; level 1 contains 16×16 blocks, where four 8×8 blocks of level 0 form this 16×16 block. The DFD signal generated by a particular motion vector for a level 1 block is determined by combining the four DFD signals generated the 8×8 blocks using the same motion vectors. This strategy continues until the highest level is obtained. The highest level of the quadtree depends on the spatial resolution, i.e., the number pixels, of the frame. A frame size of 128×128 pixels would generate a quadtree segmentation with a max$_j$ mum of five levels. For the case when a frame is not square, the quadtree code can be generalized to include combinations of quadtrees covering different size square regions of the frame. It should be noted that as a quadtree codes to lower and lower levels, the cost in bits for transmitting the segmentation increases.

To determine the rate $R^{DFD}(x_j)$ needed to encode the DFD at node $x_j$, the motion vector $m_{l,i}$ is used to generate the DFD signal for block i. Utilizing a DCT transform, this DFD signal is transformed and quantized utilizing quantizer $q_{l,i}$. The resulting distortion, $D(x_j)$ is measured in the transform domain using a mean-squared error metric. As discussed above in more particularity, any block transform with an additive distortion metric can be used. The rate for a plurality of additional coding modes can also be considered at each node. For instance, the mode when the motion vectors are assumed to be zero, called "inter" mode, or the "intra" mode, when no motion is used at all only intensity information is encoded, can serve as nodes within a quadtree level.

The rate generated at node $x_j$ for the segmentation, $R^{SEG}(x_j)$, depends on the level l. Clearly, trellis nodes which belong to blocks of smaller block sizes have a higher quad-tree segmentation cost than nodes which belong to bigger blocks. This segmentation cost can be distributed recursively among the trellis nodes. The initialization of the recursion is as follows, $$G_{(N,0)}=1 \quad (9)$$

where $G_{l,i}$ is the segmentation cost assigned to all the trellis nodes of block i at level l. Clearly, when the path includes only the top quad-tree level N then the quad-tree is not split at all and only one bit is needed to encode that fact. For the general recursion the following holds. If a path splits a given block $b_{l,i}$ then a segmentation cost of $G_{l,i}+4$ bits has to be added to its overall cost function. By splitting block $b_{l,i}$, 4 bits will be needed to encode whether the four child nodes of block $b_{l,i}$ are split or not. Since the path only visits trellis nodes and not quad-tree nodes, this cost has to be distributed to the trellis nodes of the child nodes of block $b_{l,i}$. How the cost is split among the child nodes is arbitrary since every path which visits a sub-tree rooted by one child node also has to visit the other three sub-trees rooted by the other child nodes. Therefore, it will pick up the segmentation penalty no matter how it has been distributed among the child nodes. It should be noted that if the $n_0+1$ level is split, no additional segmentation cost are incurred. This is due to the fact that the $n_0$ level is the lowest level and can not be split further. In other words, since it is known that the n. level blocks cannot be split, no information needs to be transmitted for this event.

There are two possible choices for the recursion. The first one distributes the segmentation cost along one particular child, in this case the leftmost. This results in the following recursion for $N \leq l \leq n_0+2$, $$G_{l-1,4i+0}=G_{l,i}+4,$$

$$G_{l-1,4i+j}32\ 0, j\ 68\ [1,2,3] \quad (10)$$

The second choice distributes the segmentation cost evenly among the child nodes. This results in the following recursion for $N \leq l \leq n_0+2$, $$G_{l-1,4i+j} = \frac{G_{l,i} + 4}{4}, \quad (11)$$

$$j \in [1,2,3]$$

Both methods are equivalent but the first one might be preferred since it can be done with integer arithmetic. See FIG. 3, numeral 300 for an illustration of the recursion involved in the assignment of the encoding cost for the quadtree using the first method.

Having established the multi-level trellis, the Viterbi DP algorithm is used to find the optimal state sequence $\hat{B}$ which will minimize the unconstrained problem (208). Utilizing the DP recursion formula given in Eq. (8) the steps of the Viterbi DP algorithm are defined as follows:

A) Initialization: for all $x_0 \in T_{n_0 0}$, where $T_{n_0 0}$ represents all the set of all nodes to which it is possible to make a transition to, find $\hat{J}(\lambda,x_0)$ such that $$\hat{J}(\lambda,x_0)=c(\lambda,S,x_0), \quad (12)$$

where $$c(\lambda,S,x_0)=R^{DFD}(x_0)+R^{SEG}(x_0)+R^{DVF}(S,X_0)+\lambda \cdot D(x_0),$$

and S represents the starting node, i.e., an aux$_j$ liary node representing the convention for starting the DPCM of the DVF. A pointer, $o(x_k)$ is introduced, which is used to keep track of the optimal path. Clearly, $o(x_0)=S$ is the initial condition.

B). Recursion: for each node $x_k$ of a particular level within the multi-level trellis, i.e., $k=0,K,4^{N-n_0}-2$, and for all nodes $X_{k+1}$ to which it is possible to make a transition to, the following recursions are performed:

$$\hat{J}(\lambda,x_{k+1}) = \min_{x_k \in F_{n_0,k}} (\hat{J}(\lambda,x_k) + c(\lambda,x_k,x_{k+1})) \quad (13)$$

$$o(x_{k+1}) = \arg \min_{x_k \in F_{n_0,k}} (\hat{J}(\lambda,x_k) + c(\lambda,x_k,x_{k+1}))$$

where $F_{n_0,k}$ is the set of all permissible nodes from which a transition can occur. The necessity for sets $T_{n_0,0}$ and $F_{n_0,k}$ results from the fact that transitions between certain node pairs is not allowed, as shown in FIG. 1.

C). Termination: Upon reaching the end of the trellis a second auxiliary node Z is used for termination $$\hat{J}(\lambda,Z) = \min_{x_k \in F_{n_0,4N-n_0-1}} (\hat{J}(\lambda,x_{4N-n_0-1}) + c(\lambda,x_{4N-n_0-1},Z)), \quad (14)$$

$$o(Z) = \arg \min_{x_k \in F_{n_0,4N-n_0-1}} (\hat{J}(\lambda,x_{4N-n_0-1}) + c(\lambda,x_{4N-n_0-1},Z)).$$

Basically, the termination node Z is used to determine the minimum of all Lagrangian cost functions at the last optimal node of the trellis $4^{N-n_0}-1$, since $c(\lambda,x_{4^{N-n_0}-1},Z)=0$.

D). Backtracking: Let $y_k$ indicate the optimal state for each stage of the trellis k. Utilizing the pointer o the optimal state sequence $\hat{B}=|y_k, y_{k-1}, y_{k-2}L, y_0|$, i.e., path through the trellis, is obtained by the following method:

i) initialize: $y_0=Z$, $k=1$ ii) Continue: $y_k=o(Y_{k-1})$, $k=k+1$ iii) Terminate if: $y_k=S$.

Based on the optimal state sequence $\hat{B}=|y_k y_{k-1}, y_{k-2}L$ $, y_0|$, the frame is encoded (210). As described particularity above, the optimal state sequence provides a solution to the unconstrained problem given in Eq. (3). However, depending on the value of $\lambda$, this solution may or may not result in the desired distortion $D_C$ or rate $R_c$. For instance, if a particular rate $R_c$ is desired, then the correct $\lambda_c$ must be determined that will locate the point on the convex hull that corresponds to both $R_c$ and $D_c$. Therefore, for the case when a particular rate is desired, the optimal state sequence $\hat{B}$ is used to encode the frame (210) and the resulting rate $R_{final}$ is compared to this desired rate $R_c$ (212). If the resulting rate $R_{final}$ is within a predetermined tolerance of the desired rate $R_c$ then the encoding process is terminated (212). This predetermined tolerance is typically 10% of the desired value. The process is identical if a particular distortion $D_c$ is desired.

If the resulting rate $R_{final}$ does not meet the predetermined tolerance, then a new $\lambda$ must be determined (214). Furthermore, a new optimal path through the trellis must also be determined (208). Several approaches which take advantage of the convex hull relationship between rate and distortion can be employed to determine a new $\lambda$ (214). These approaches included: the bisection method utilizing an arithmetic mean, bisection method utilizing a geometric mean, fast convex search method, and a parametric parabola such as a Bezier curve. Each method will provide a new $\lambda$ that results in rate or distortion that is closer to the target (214).

Figure 3:
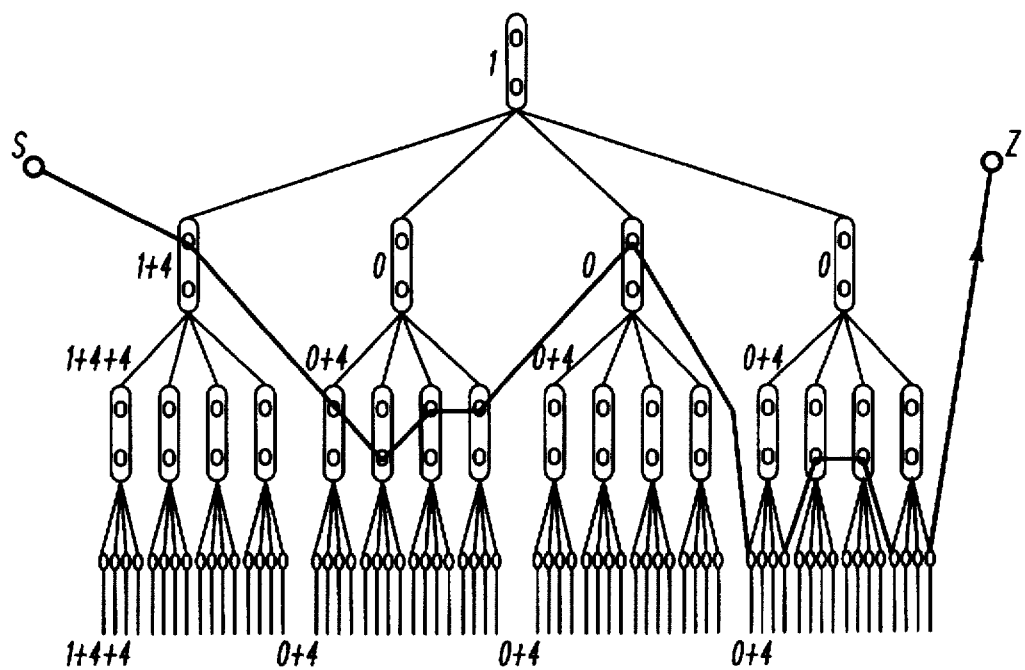
FIG. 3 is a diagrammatic representation of the recursion involved in the assignment of quadtree encoding costs in accordance with the present invention.
Figure 4:
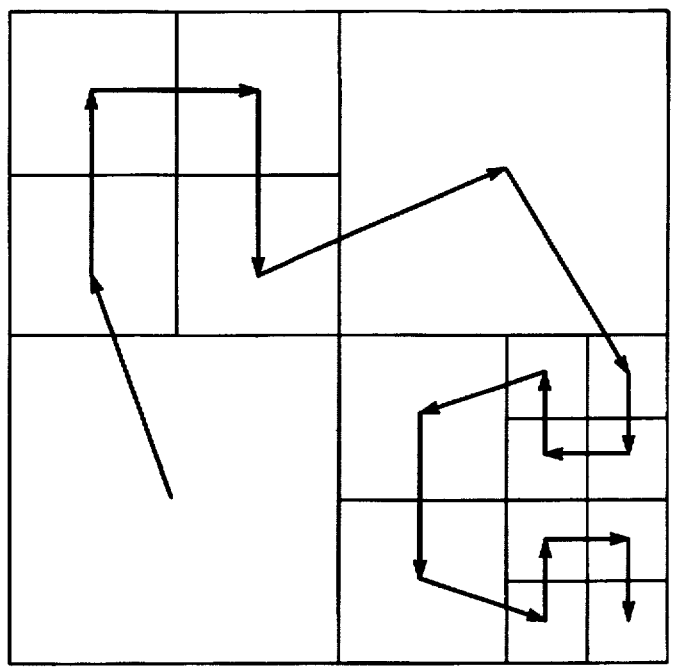
FIG. 4 is a flow diagram of a preferred embodiment of a method for optimally encoding a given frame of a video sequence in the rate distortion sense.

FIG. 3, numeral 300 also provides an illustration of an optimal path through a multi-level trellis. As described above, this path provides the optimal bit allocation between data types: DFD, DVF and segmentation. FIG. 4, numeral 400 is an illustration of the resulting variable block size segmentation resulting from the optimal path shown in FIG. 3, numeral 300.

Figure 5:
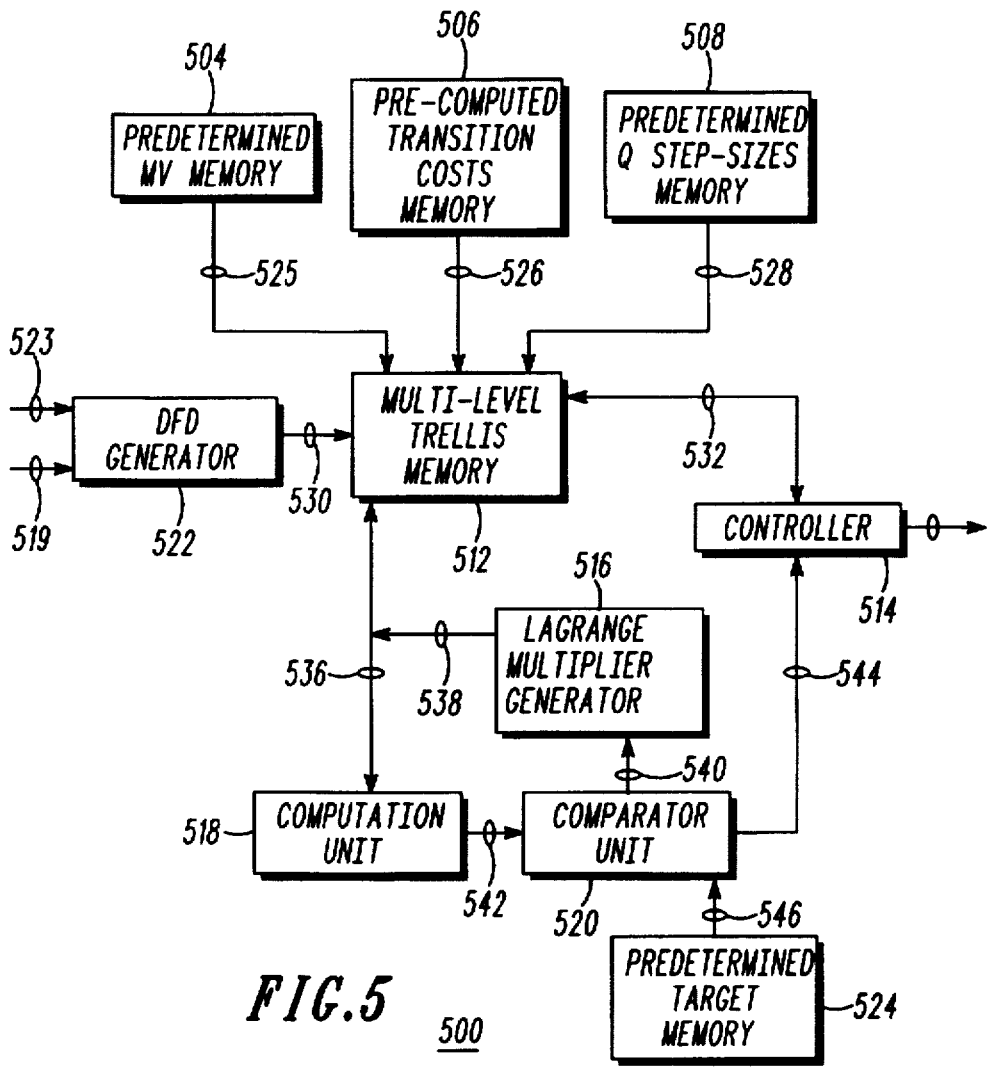
FIG. 5 is a block diagram of a preferred embodiment of a device for optimally encoding a given frame of a video sequence in the rate distortion sense.

FIG. 5, numeral 500, is a block diagram of a preferred embodiment of a device for optimal encoding of a displacement vector field, displaced frame difference and segmentation in accordance with the present invention. It includes: a predetermined motion vector memory (504), transition cost memory (506), predetermined quantizer step size memory (508), a displaced frame difference generator (510), a trellis memory (512), a controller (514), a computation unit (518), a Lagrange multiplier calculator (520), a comparator unit (522), and a predetermined target memory (524). The device is coupled to two frame buffer memory units through inputs (519) and (523). The frame buffer memory units store and provide when necessary the pixels of the present frame (523) as well as the pixels from previous encoded frame (519). These inputs are coupled to the displaced frame difference generator (522). The displaced frame difference generator (522) utilizes (517) the predetermined set of motion vectors stored in the predetermined motion vector memory (504) to generate a plurality of displaced frame differences for each block at the lowest level of the quadtree. The results of the displaced frame difference generator are stored (530) within the multi-level trellis memory (512).

The multi-level trellis memory (512) is coupled with the predetermined motion vector memory (504), the transition cost memory (506), the quantizer step size memory (508), a controller (514), a computation unit (518), as well as with the displaced frame difference generator (522). Based on inputs from the displaced frame difference generator (522), the predetermined motion vector memory (504), the transition cost memory (506), and the quantizer step size memory (508) the multi-level trellis memory (512) stores the information required to determine all nodes within a multi-level trellis. The computation unit (518) utilizes (536) this information to calculate the rate and distortion generated by each node in the multi-level trellis, which is also stored in the multi-level trellis memory (512).

Based on the rate-distortion information stored in the multi-level trellis memory (512) and an initial value for $\lambda$ (538) from the Lagrange multiplier generator (516) the computation unit (518) performs the Viterbi algorithm described above in particularity. The computation unit (518) finds the optimal path B through the trellis. Once the optimal path is determined, the resulting rate $R_{final}$ or distortion $D_{final}$ is compared using a comparator (520) to a predetermined target stored in the predetermined target memory (524). If the problem being solved is to minimize the distortion given some number of bits, then the resulting rate $R_{final}$ is compared to this number. If the problem being solved is to minimize the number of bits generated given some distortion, then the resulting distortion $D_{final}$ is compared to this desired distortion For the case when the distortion is to be minimized given some number of bits per frame, the comparator unit performs the following function:

if $(1-\alpha) R_{target} \leq R_{final} \leq (1+\alpha)R_{target}$ $\Delta=1$, else $\Delta=0$.

If $\Delta=1$, the optimization is complete and the problem is solved. The controller unit, which is coupled (544) to the comparator unit (520), is signalled when $\Delta=1$ and retrieves (532) from the multi-level trellis memory (512) the bits which result from this optimal encoding. The controller unit (514) outputs these bits (534) for use in the intended application.

If $\Delta=0$, the optimization is not complete and a new $\lambda$ is required. The Lagrange multiplier generator (516), which is also coupled (540) to the comparator unit (520), is signalled when $\Delta=0$. Based on the previous two Lagrange multiplier values, a new $\lambda$ is chosen using one of the four methods described above. For instance, using the bisection method with arithmetic mean a new $\lambda$ is chosen that is directly between the last two values. In the case, when two previous values are not available, the boundaries of $\lambda=1$ and $\lambda=2000$ are used. This process is continued until $\Delta=1$.

A similar decision rule is used for the case when the rate is to be minimized given some distortion. This decision rule is given as:

if $(1-\alpha)D_{target} \leq D_{final} \leq (1+\alpha)D_{target}$ $\Delta=1$, else $\Delta=0$.

Figure 6:
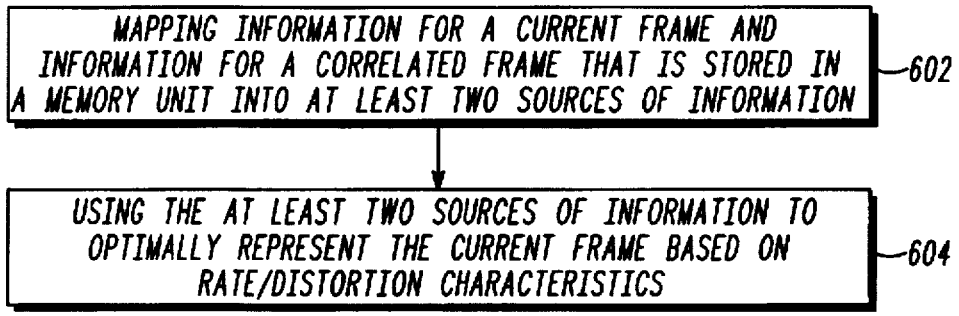
FIG. 6 is a flow chart showing one embodiment of steps for implementing the method in accordance with the present invention.

FIG. 6, numeral 600, is a flow chart showing one embodiment of steps for implementing the method in accordance with the present invention. The method allocates bits for optimal rate/distortion performance in digital video compression by: A) mapping (602) information for a current frame and information for a correlated frame that is stored in a memory unit into at least two sources of information; and B) using (604) the at least two sources of information to optimally represent the current frame based on rate/distortion characteristics.

Where selected, the rate/distortion characteristics may be minimized using a Lagrangian relaxation scheme. In addition, the minimization step of the Lagrangian relaxation scheme may be performed utilizing a dynamic programming approach implemented on a trellis. A predetermined set of admissible DVFs or a predetermined set of admissible quantization values may be utilized.

Where selected, the Lagrangian coefficient may be determined using at least one of: A) a bisection method using an arithmetic mean; B) a bisection method using a geometric mean; C) a fast convex search; and D) a parametric parabola such as the Bezier curve.

Where selected, for a predetermined number of bits per frame, distortion may be minimized, or for a preselected distortion per frame, a number of bits may be minimized.

Typically, the at least two sources of information include at least two of: A) displaced frame difference information; B) displacement vector field information; and C) segmentation information.

The displaced frame difference is generally determined by the following equation:

$$dfd\begin{pmatrix} r \\ r \end{pmatrix} = f_k\begin{pmatrix} r \\ r \end{pmatrix} - f_{k-1}\begin{pmatrix} r - \frac{1}{d}\begin{pmatrix} r \\ r \end{pmatrix} \end{pmatrix}.$$

The displacement vector field information may be determined utilizing a block matching motion estimation approach. The segmentation information may be determined utilizing a quadtree segmentation approach.

The contribution to the rate by the DFD may be generated by utilizing at least one of the following compression techniques: A) Discrete Cosine Transform; and B) Vector Quantization. The contribution to the rate by the displacement vector field may be generated using differential pulse code modulation with a single neighbor of a predetermined scanning order through the current frame. The contribution to the rate by the segmentation may be generated through the quadtree representation. Generally, at least one of the following predetermined scanning orders is used: A) Hilbert scan; and B) Raster scan.

Figure 7:
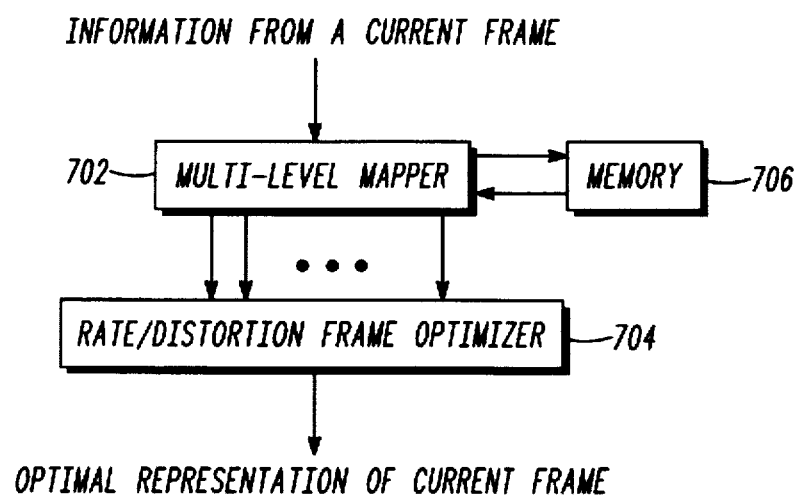
FIG. 7 is a block diagram of one embodiment of a device in accordance with the present invention.

FIG. 7, numeral 700, is a block diagram of one embodiment of a device in accordance with the present invention. The device allocates bits for optimal rate/distortion performance in digital video compression by: A) a multi-level mapper (702), for mapping information for a current frame and information for a correlated frame that is stored in a memory unit (706) into at least two sources of information; and B) a rate/distortion frame optimizer (704), coupled to the multi-level mapper, for using the at least two sources of information to optimally represent the current frame based on rate/distortion characteristics. The device may be further implemented in accordance with the method described above.

The method and device may be selected to be embodied in least one of: A) an application specific integrated circuit; B) a field programmable gate array; and C) a microprocessor; and D) a computer-readable memory; arranged and configured for allocating bits for optimal rate/distortion performance in digital video compression in accordance with the scheme described in greater detail above.

We claim:

1. A method for allocating bits for optimal rate/distortion performance in digital video compression, comprising the steps of:
   A) mapping information for a current frame and information for a correlated frame that is stored in a memory unit into a set of information of A1–A4:
      A1) displaced frame difference information and displacement vector field information;
      A2) displaced frame difference information and segmentation information;
      A3) displacement vector field information and segmentation information;
      A4) displaced frame difference information, displacement vector field information, and segmentation information;
   B) using the set of information to optimally represent the current frame based on rate/distortion characteristics.

2. The method of claim 1 wherein the rate/distortion characteristics are minimized using a Lagrangian relaxation scheme.

3. The method of claim 2 where the minimization step of the Lagrangian relaxation scheme is performed utilizing a dynamic programming approach implemented on a trellis.

4. The method of claim 3 further including utilizing a predetermined set of admissible displacement vector fields.

5. The method of claim 3 further including utilizing a predetermined set of admissible quantization values.

6. The method of claim 2 wherein the Lagrangian coefficient is determined using at least one of:
   A) Bisection method using an arithmetic mean;
   B) Bisection method using a geometric mean;
   C) Fast convex search; and
   D) Parametric parabola such as the Bezier curve.

7. The method of claim 1 wherein the displaced frame difference information is determined by the following equation:

$$dfd(r) = f_k(r) - f_{k-1}(r-d(r)).$$

8. The method of claim 1 wherein the displacement vector field information is determined utilizing a block matching motion estimation approach.

9. The method of claim 1 wherein the segmentation information is determined utilizing a quadtree segmentation approach.

10. The method of claim 9 wherein the contribution to the rate by the segmentation information is generated through the quadtree representation.

11. The method of claim 1 wherein the contribution to the rate by the displaced frame difference information is generated by utilizing at least one of the following compression techniques:

A) Discrete Cosine Transform; and

B) Vector Quantization.

12. The method of claim 1 wherein the contribution to the rate by the displacement vector field information is generated using differential pulse code modulation with a single neighbor of a predetermined scanning order through the current frame.

13. The method of claim 12 wherein at least one of the following predetermined scanning orders is used:

A) Hilbert scan; and

B) Raster scan.

14. The method of claim 1 wherein the method is a process whose steps are embodied in an application specific integrated circuit arranged and configured to determine the first modified received signal having minimized distortion and interference.

15. The method of claim 1 wherein, for a predetermined number of bits per frame, distortion is minimized.

16. The method of claim 1 wherein, for a preselected distortion per frame, a number of bits is minimized.

17. The method of claim 1 wherein the method is a process whose steps are embodied in a field programmable gate array, arranged and configured to determine the first modified received signal having minimized distortion and interference.

18. The method of claim 1 wherein the method is a process whose steps are embodied in a microprocessor, arranged and configured to determine the first modified received signal having minimized distortion and interference.

19. The method of claim 1 wherein the method is a process whose steps are embodied in a computer-readable memory, arranged and configured to determine the first modified received signal having minimized distortion and interference.

20. A device for allocating bits for optimal rate/distortion performance in digital video compression, wherein the device is directed by a computer program and the computer program includes steps of A–B:

A) mapping information for a current frame and information for a correlated frame that is stored in a memory unit into a set of information of A1–A4:

A1) displaced frame difference information and displacement vector field information;

A2) displaced frame difference information and segmentation information:

A3) displacement vector field information and segmentation information:

A4) displaced frame difference information, displacement vector field information, and segmentation information; and B) using the set of information to optimally represent the current frame based on rate/distortion characteristics.

21. The device of claim 20 wherein the rate/distortion characteristics are minimized using a Lagrangian relaxation scheme.

22. The device of claim 21 where the minimization step of the Lagrangian relaxation scheme is performed utilizing a dynamic programming approach implemented on a trellis.

23. The device of claim 22 further including utilizing a predetermined set of admissible quantization values.

24. The device of claim 22 further including utilizing a predetermined set of admissible displacement vector fields.

25. The device of claim 21 wherein the Lagrangian coefficient is determined using at least one of:

A) Bisection method; and

B) Parametric parabola such as the Bezier curve.

26. The device of claim 20 wherein, for a predetermined number of bits, distortion is minimized.

27. The device of claim 20 wherein, for a preselected distortion per frame, a number of bits is minimized.

28. The device of claim 20 wherein the contribution to the rate by the displacement vector field information is generated using differential pulse code modulation with a single neighbor of a predetermined scanning order through the current frame.

29. The device of claim 28 wherein at least one of the following predetermined scanning orders is used:

A) Hilbert scan; and

B) Raster scan.

30. The device of claim 20 wherein the displaced frame difference information is determined by the following equation:

$$dfd(r) = f_k(r) - f_{k-1}(r - d(r)).$$

31. The device of claim 20 wherein the displacement vector field information is determined utilizing a block matching motion estimation approach.

32. The device of claim 20 wherein the segmentation information is determined utilizing a quadtree segmentation approach.

33. The device of claim 32 wherein the contribution to the rate by the segmentation information is generated through the quadtree representation.

34. The device of claim 20 wherein contribution to the rate by the displaced frame difference information is generated by utilizing at least one of the following compression techniques:

A) Discrete Cosine Transform; and

B) Vector Quantization.

35. A device for allocating bits for optimal rate/distortion performance in digital video compression comprising:

A) a multi-level mapper, for mapping information for a current frame and information for a correlated frame that is stored in a memory unit into a set of information of A1–A4;

A1) displaced frame.difference information and displacement vector field information;

A2) displaced frame difference information and segmentation information:

A3) displacement Mec!to field information and segmentation information;

A4) displaced frame difference information, displacement vector field information, and segmentation information; and B) a rate/distortion frame optimizer, coupled to the multi-level mapper, for using the set of information to optimally represent the current frame based on rate/distortion characteristics.

36. A device for allocating bits for optimal rate/distortion performance in digital video compression, wherein the available bits per frame are allocated among at least two sources of information comprising at least two of:

A) displaced frame difference, DFD, information;

B) displacement vector field information; and

C) segmentation information;

wherein the device comprises:

D) a DFD generator coupled to receive input from two frame buffer memories, for generating a DFD signal;

E) a predetermined motion vector memory;

F) a pre-computed transition costs memory;

G) a predetermined quantization step size memory;

H) a computation unit, for computing an optimal encoded frame;

I) a predetermined target memory;

J) a comparator unit coupled to receive input from the predetermined target memory and the computation unit, for determining compliance with a predetermined target;

K) a Lagrange multiplier generator coupled to the comparator unit and the computation unit, for generating a Lagrange multiplier parameter for use in the computation unit;

L) a multi-level trellis memory coupled to the DFD generator, the predetermined motion vector memory, the pre-computed transition costs memory, the predetermined quantization step memory, the controller, and the computation unit.

37. The device of claim 36 wherein the device is embodied in a computer-readable memory, arranged and configured for allocating bits for optimal rate/distortion performance in digital video compression, wherein the available bits per frame are allocated among at least two sources of information in accordance with a scheme of claim 36.

38. The device of claim 36 wherein the device is embodied in a microprocessor, arranged and configured for allocating bits for optimal rate/distortion performance in digital video compression, wherein the available bits per frame are allocated among at least two sources of information in accordance with a scheme of claim 36.

39. The device of claim 36 wherein the device is embodied in an application specific integrated circuit, arranged and configured for allocating bits for optimal rate/distortion performance in digital video compression, wherein the available bits per frame are allocated among at least two sources of information in accordance with a scheme of claim 36.

40. The device of claim 36 wherein the device is embodied in a field programmable gate array, arranged and configured for allocating bits for optimal rate/distortion performance in digital video compression, wherein the available bits per frame are allocated among at least two sources of information in accordance with a scheme of claim 36.

* * * * *